June 21, 1932. F. HILL 1,864,135
APPARATUS FOR USE IN SCALDING ANIMAL OFFALS
Filed May 14, 1929

INVENTOR:-
Frederick Hill

BY HIS ATTORNEYS:-

Patented June 21, 1932

1,864,135

UNITED STATES PATENT OFFICE

FREDERICK HILL, OF URMSTON, ENGLAND

APPARATUS FOR USE IN SCALDING ANIMAL OFFALS

Application filed May 14, 1929, Serial No. 363,063, and in Great Britain May 16, 1928.

This invention of improvements in apparatus for use in scalding animal offals and especially reeds or black tripes which are more susceptible to damage by delay in submission to scalding or by slow scalding than other animal offals, relates to apparatus for scalding tripes, animal feet and other animal offals.

This invention provides an apparatus in which the scalding liquid at scalding temperature is kept in rapid circulation and so in condition to scald rapidly and perfectly black tripes or other animal offals, and the scalding liquid being kept in rapid circulation is enabled to convey material from the place at which it is introduced into the scalding liquid to the place of removal therefrom. Furthermore since the scalding liquid is retained in the apparatus for any desired time any valuable product, for example pepsin, washed or dissolved from the material scalded may be recovered from said liquid.

An apparatus provided according to this invention consists in a tank which provides a channel for the passage of scalding liquid and which compels black tripes or other material to be scalded introduced into the tank in one part of the channel to pass in the requisite direction from the place of introduction to the place of removal from the tank and which is provided with a pipe or pipes for the discharge of steam into liquid in the tank for heating the liquid or keeping it hot and keeping it in circulation through the channel. In preferred forms this heater device comprises a bell or other device applied with the pipe or pipes for the supply of steam to the tank and furnished with or in connection with an inlet or inlets for air, to obviate noise in the discharge of the steam into the liquid while enabling it to effect the circulation of the liquid.

The channel may be formed in any way appropriate as for example by a tank being made in the form of an annular or closed circuit or made to present two communicating limbs or compartments each closed at one end and having the closed ends connected by a pipe or pipes or passage or passages or by the provision in a tank of oblong or other form of a partition or division perforated in part so as to allow of the circulation of water while determining the path of the black tripes or other material to be scalded.

The material to be scalded may be placed or supplied by hand or otherwise in or to the tank at one part thereof and the scalded material may be removed from the tank by hand or in any other manner at the place intended.

Figure 1:
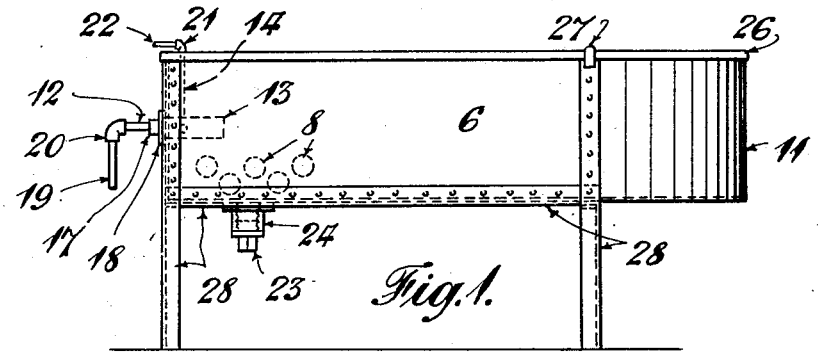
Figure 2:
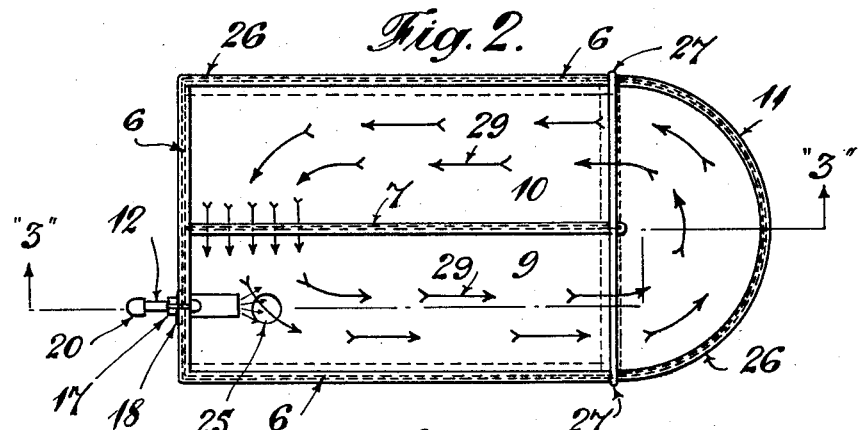
Figure 3:
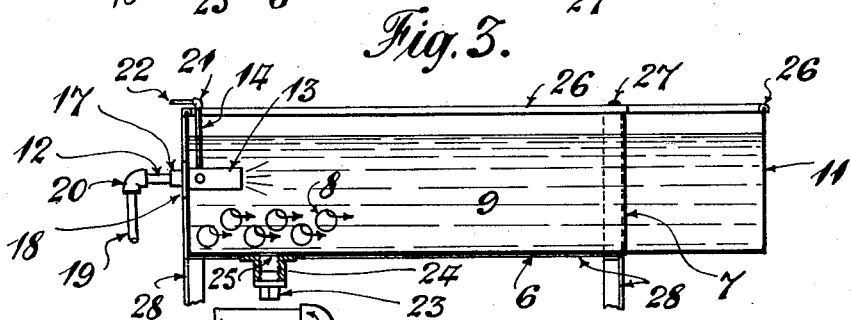
Figure 4:
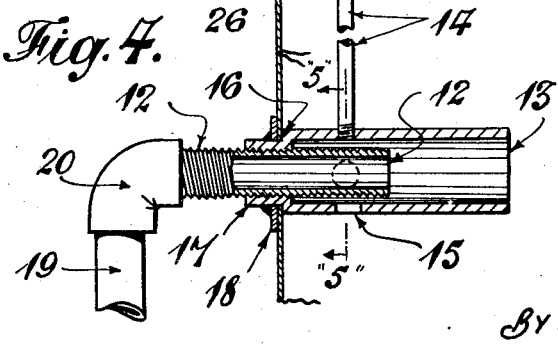
Figure 5:
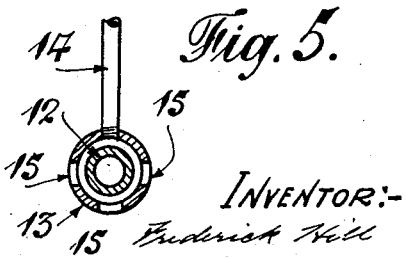

In the accompanying drawing a scalding apparatus provided according to this invention in the form to be described as an illustrative embodiment is illustrated in Figs. 1, 2 and 3, Fig. 1 being a side elevation, Fig. 2 a plan and Fig. 3 a vertical section taken through the apparatus on the plane indicated by the line 3—3 of Fig. 2. Fig. 4 is a vertical section drawn on a larger scale than Figs. 1, 2 and 3 partly in side view for greater clearness showing the device for the supply of steam and inlet of air and Fig. 5 is a transverse section thereof taken on the plane indicated by the line 5—5 of Fig. 4 and partly in elevation. The same numerals of reference are employed to indicate corresponding parts in all the figures.

The scalding apparatus shown in Figs. 1, 2 and 3 comprises a tank 6 divided for the greater part of its length by a partition or screen 7 perforated with holes 8 as shown or if desirable otherwise contrived near one end to allow the passage of liquid, into two compartments or limbs 9, 10 each closed at one end and communicating by their other ends in a part of the tank 6 bounded by a wall 11 curved approximately in a semi-circle. The holes 8 are made large enough or sufficiently numerous to allow water or other liquid to flow freely around the tank 6 under the impulse of the steam discharged into it as will be described hereinafter.

A pipe 12 or if desirable two or more such pipes for the supply of steam and furnished with a bell 13 or bells surrounding the outlet or outlets and to be immersed in liquid in the tank 6 and furnished with a pipe 14 or pipes or other means for the inlet of air so that steam discharged into the bell 13 or bells will drawn air therein and discharge it into the liquid, is or are provided at or near the closed end of the one compartment or limb 9 of the tank so that the steam may be discharged into the liquid without undue noise and will nevertheless keep the liquid in circulation through the channel provided in the limbs 9 and 10 of the tank 6.

The bell 13 is shown as formed at one end with an open mouth to open into the tank 6 and near its other end is formed with openings 15 at opposite sides and the bottom for the entrance of water or other liquid from the tank 6. The bell 13 is shown as formed with an annular shoulder 16 and a projection 17 of smaller diameter at the end by which the pipe 12 is to be connected and is inserted by that end in a hole in the wall of the tank 6 and together with a plate 18 applied around the projection 17 secured in position in the wall of the tank 6 by brazing.

In the interior of the projection 17 is formed a screw-threaded hole into which the pipe 12 is screwed. A pipe 19 screwed into a curved opening 20 screwed upon the pipe 12 serves to convey steam thereto. A pipe 14 is screwed into a screw-threaded hole in the upper side of the bell 13 and is furnished with a curved coupling 21 screwed upon it and having another pipe 22 screwed into it so that air may pass into the bell 13 under the influence of the steam discharged into and the water or other liquid made to pass through the bell 13.

The screw threads provided in the projection 17 for the reception of the pipe 12 and the screw thread on the pipe 12 screwed therein facilitate longitudinal adjustment of the pipe 12 in order that the discharge of steam and inlet of air into the water or other liquid in the tank 6 may be made to give the desired steady current of liquid without noise or undue bubbling.

Provision is made in any convenient manner for the supply of water or other liquid to the tank 6.

Although, for simplicity, provision for the supply of water or other liquid is omitted from the drawing, there may be provided for that supply for example, a hose-pipe or a pipe with a cock opening above the tank in any convenient position or an inlet pipe with a cock connected to the tank 6. Provision is also made in any suitable way for the removal of water or other liquid from time to time from the tank 6 as for example the bottom of the tank 6 may be provided with an opening furnished with a cock or plug serving by opening or removal to allow the water or other scalding liquid to run from the tank 6 and any matter deposited in the tank 6 to be discharged. In the case illustrated a removable screw-threaded plug 23 is screwed into a socket 24 surrounding a hole 25 in the bottom of the tank 6.

The walls and bottom of the tank 6, and the partition or screen 7 are all shown as formed of metal sheet or plate and riveted together and to a frame-work 28 further to be described herein.

Beads or rims 26 of sheet metal folded or curled upon itself, as shown best in Fig. 4 are shown as applied on and secured as by riveting on the upper edges of the wall of the tank 6 and the partition or screen 7 in order to obviate risk of injury to the wet and tender hands and arms of operators working with the apparatus. 27 is a stay secured as by riveting to the partition or screen 7 at the end nearest the rounded end of the tank 6 and to the wall of the tank 6 at the sides in order to secure the partition or screen 7 against bending or strain. The stay 27 is made to present a semicircular transverse section or rounded upper surface so as to obviate risk of injury to the wet and soft hands and arms of operators.

The frame-work 28 serving to support and stiffen the walls and bottom of the tank 6 by being riveted thereto and to form legs or feet, is shown as formed of angle plates which in the case of the two nearer the rounded end of the tank 6, are divided along part of the angle so that each is made to present one arm to extend up the side of the tank 6 and another arm which is bent to extend across beneath the bottom of the tank 6. Preferably the tank 6 is galvanized when fully constructed.

In Fig. 2 the arrows 29 indicate the direction of the flow of the water and the direction in which the material being scalded is made to pass along the tank 6.

When the tank 6 has been filled with water or other liquid to the depth intended or requisite and steam is supplied through the pipe 12 to the bell 13, the steam will be condensed in heating the water or other liquid and in discharging water through the open mouth of the bell 13 will cause other water or liquid to enter the bell 13 through the holes 15 and air entering by the pipe 14 will minimize noise caused by the discharge of the steam into the water or other liquid.

The tank 6 being filled with water or other liquid and the water or liquid having been heated to a suitable scalding temperature, the black tripes or other materials previously washed in any suitable way ready to be scalded, are introduced into the tank 6 near the closed end of the limb or compartment 9 furnished with the pipe 12 or pipes for admission of steam and by the introduction of further tripes and materials to be scalded and also by the circulating scalding liquid and by the action of persons handling or working the tripes or materials in the scalding thereof, the tripes or materials are passed gradually first along that compartment or limb 9 and then into the other 10, and then eventually to or near to the closed end of that other limb or compartment 10, there to be removed from the tank 6.

The scalding liquid contained in the tank 6 may be kept in use as long as may be desirable before being discharged or removed and in particular in order that any product or constituent, for example pepsin, washed or dissolved from material scalded may accumulate to any desirable concentration before the scalding liquid is discharged or removed from the tank 6.

Obviously there is opportunity for variation of detail in the construction of scalding apparatus according to this invention, as for example, in particular, the provision or omission of pipes for the supply of water or other liquid.

What I do claim as my invention and desire to secure by Letters Patent is:

1. A scalding apparatus for the purpose indicated comprising a tank presenting a channel in the form of a closed circuit in the form of two communicating limbs each closed at one end formed by means of a vertically disposed partition extending in part of the tank and contrived in part to provide passage to allow of the circulation of liquid while determining the path of material introduced for scalding from the place of introduction near the closed end of one limb to the place of removal near the closed end of the other limb, a pipe for the discharge of steam into liquid in the tank for heating or keeping hot the liquid in the tank and keeping it in circulation through the channel and a bell applied to provide a chamber around the outlet of said pipe and provided with an inlet and outlet for liquid and means for the inlet of air to said chamber.

2. A scalding apparatus for the purpose indicated comprising, a tank providing a channel in the form of a closed circuit presenting two communicating limbs each closed at one end and having the closed ends connected to allow of the circuit of liquid in an orbit mainly horizontal and a permanently fixed partition therein extending in part of the tank to separate one of said limbs from the other and formed in part with holes to allow liquid to flow through it from one of said limbs to the other so separating the place of introduction of material for scalding into the tank from the place of removal of scalded material while compelling material introduced for scalding to pass in the direction from the place of introduction to the place of removal, and means for the discharge of steam into liquid in the tank for heating or heating and keeping hot the liquid and keeping it in circulation around the channel.

3. A scalding apparatus for the purpose indicated comprising, a tank providing a channel in the form of a closed circuit presenting two communicating limbs each closed at one end and having the closed ends connected to allow of the circuit of liquid in an orbit mainly horizontal and a permenently fixed partition therein extending in part of the tank to separate one of said limbs from the other and formed in part with holes to allow liquid to flow through it from one of said limbs to the other so separating the place of introduction of material for scalding into the tank from the place of removal of scalded material while compelling material introduced for scalding to pass in the direction from the place of introduction to the place of removal, a pipe for the discharge of steam into liquid in the tank for heating or heating and keeping hot the liquid in the tank and keeping it in circulation around the channel, a bell applied to provide a chamber around the outlet of said pipe and having an inlet and outlet for liquid, and means for the inlet of air to said chamber.

4. A scalding apparatus for the purpose indicated comprising a tank, a division therein extending from one part of the wall of said tank towards but not to an opposite part, means for passage of liquid from space at one side of said division to space at the other side of said division whereby a horizontal channel is provided in the form of a closed circuit for the circulation of scalding liquid in an orbit mainly horizontal and compelling material introduced to pass in the requisite direction from the place of introduction to the place of removal, means for the discharge of steam into liquid in the tank for heating or heating and keeping hot the liquid and keeping it in circulation through the channel and means coacting with said steam discharge means for the inlet of air along with the steam.

5. A scalding apparatus for the purpose indicated comprising a tank, a division therein extending from one part of the wall of said tank towards but not to an opposite part, means for passage of liquid from space at one side of said division to space at the other side of said division whereby a horizontal channel is provided in the form of a closed circuit for the circulation of scalding liquid in an orbit mainly horizontal and compelling material introduced to pass in the requisite direction from the place of introduction to the place of removal, a pipe for the discharge of steam into liquid in the tank for heating or heating and keeping hot the liquid and keeping it in circulation through the channel and means coacting with said steam discharge means for the inlet of air along with the steam.

6. A scalding apparatus for the purpose indicated comprising a tank, a division therein extending from one part of the wall of said tank towards but not to an opposite part, means for passage of liquid from space at one side of said division to space at the other side of said division whereby a horizontal channel is provided in the form of a closed circuit for the circulation of scalding liquid in an orbit mainly horizontal and compelling material introduced to pass in the requisite direction from the place of introduction to the place of removal, a pipe for the discharge of steam into liquid in the tank for heating or heating and keeping hot the liquid and keeping it in circulation through the channel and a bell applied to provide a chamber around the outlet of said pipe and means for the inlet of air to said chamber.

7. A scalding apparatus for the purpose indicated comprising a tank, a permanently fixed division therein extending from one part of the wall of said tank towards but not to an opposite part, means for passage of liquid from space at one side of said division to space at the other side of said division whereby a horizontal channel is provided in the form of a closed circuit for the circulation of scalding liquid in an orbit mainly horizontal and compelling material introduced to pass in the requisite direction from the place of introduction to the place of removal, means for the discharge of steam into liquid in the tank for heating or heating and keeping hot the liquid and keeping it in circulation through the channel and means coacting with said steam discharge means for the inlet of air along with the steam.

8. A scalding apparatus for the purpose indicated comprising a tank, a permanently fixed division therein extending from one part of the wall of said tank towards but not to an opposite part, means for passage of liquid from space at one side of said division to space at the other side of said division whereby a horizontal channel is provided in the form of a closed circuit for the circulation of scalding liquid in an orbit mainly horizontal and compelling material introduced to pass in the requisite direction from the place of introduction to the place of removal, a pipe for the discharge of steam into liquid in the tank for heating or heating and keeping hot the liquid and keeping it in circulation through the channel and means coacting with said steam discharge means for the inlet of air along with the steam.

9. A scalding apparatus for the purpose indicated comprising a tank, a permanently fixed division therein extending from one part of the wall of said tank towards but not to an opposite part, means for passage of liquid from space at one side of said division to space at the other side of said division whereby a horizontal channel is provided in the form of a closed circuit for the circulation of scalding liquid in an orbit mainly horizontal and compelling material introduced to pass in the requisite direction from the place of introduction to the place of removal, a pipe for the discharge of steam into liquid in the tank for heating or heating and keeping hot the liquid and keeping it in circulation through the channel and a bell applied to provide a chamber around the outlet of said pipe and means for the inlet of air to said chamber.

In testimony, that I claim the foregoing as my invention, I have signed my name this third day of May, 1929.

FREDERICK HILL.